Dec. 15, 1970  C. C. BECK  3,548,168
AUTOMATIC LUMBER SCALER
Filed Nov. 30, 1967  3 Sheets-Sheet 1
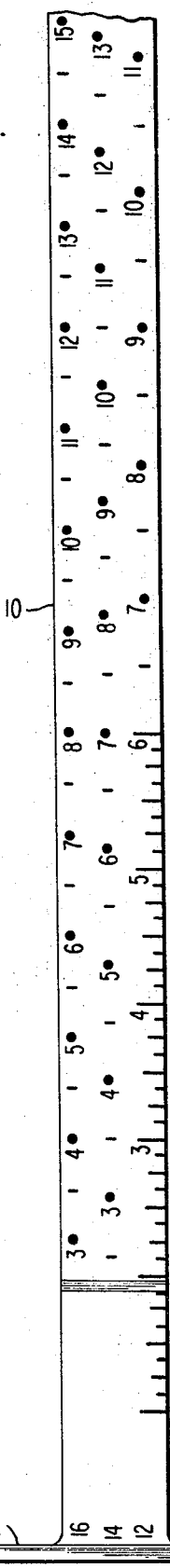
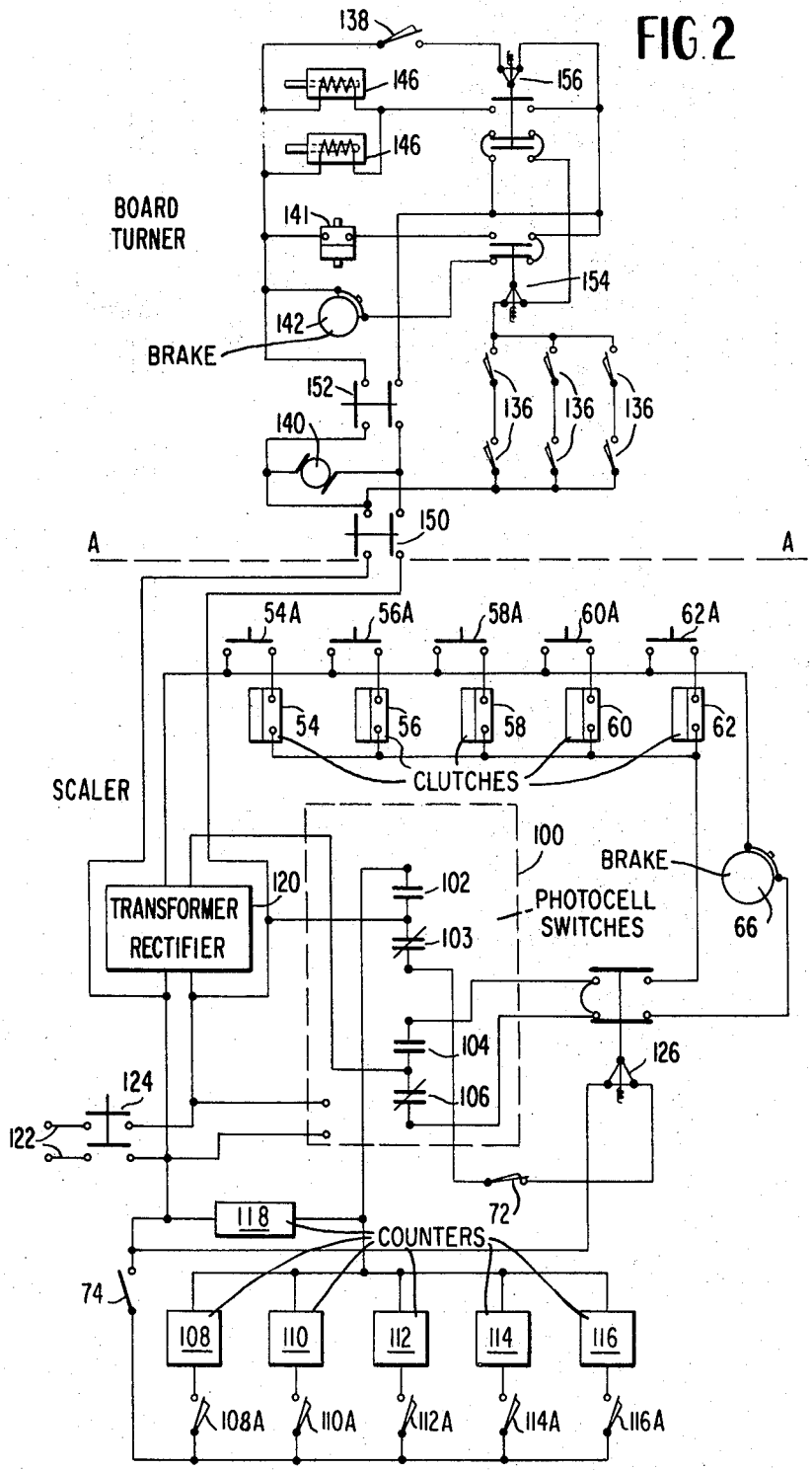
INVENTOR
CLAYBORNE C. BECK
BY Kenon, Palmer, Stewart & Estabrook
ATTORNEYS

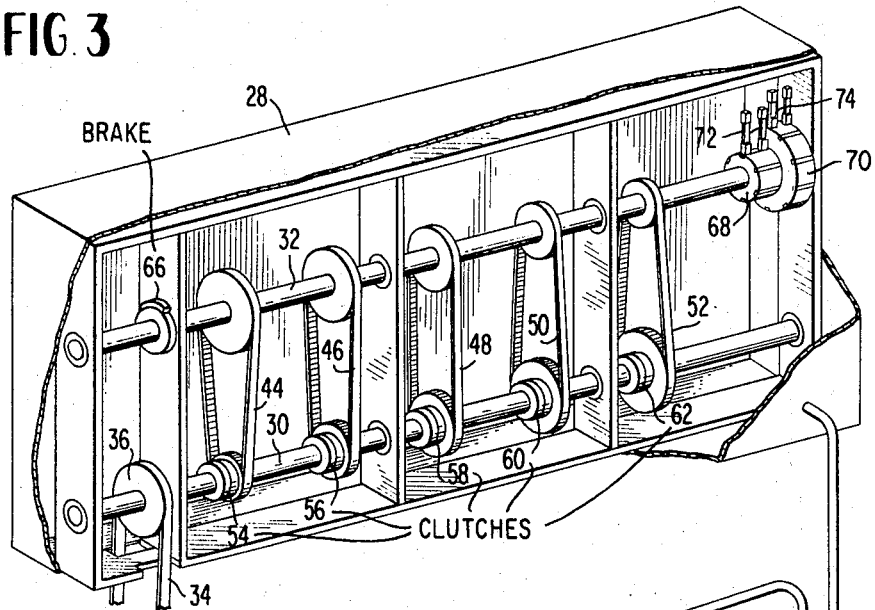
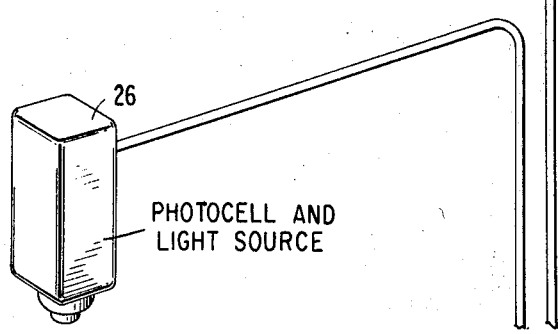
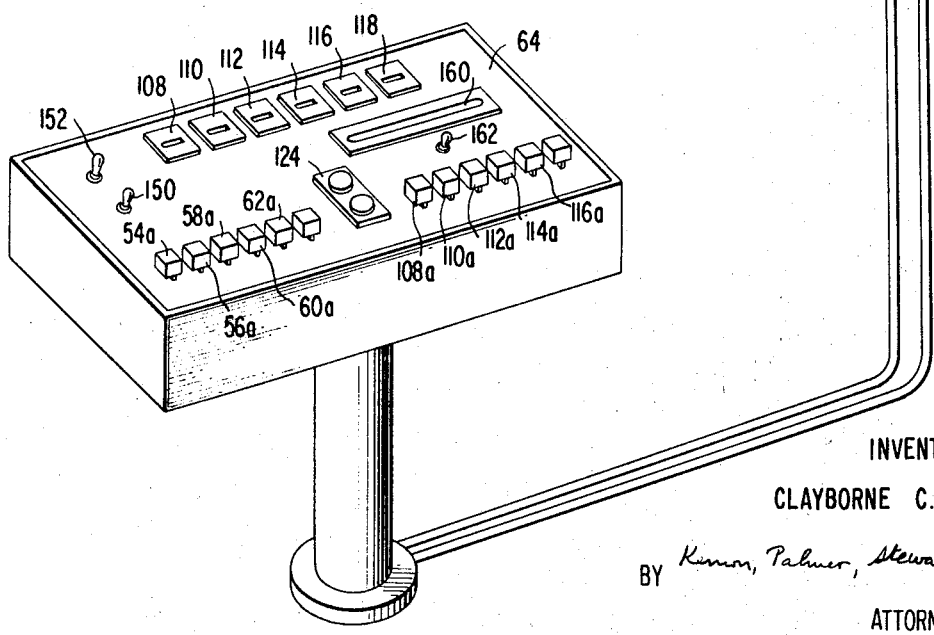

Dec. 15, 1970   C. C. BECK   3,548,168
AUTOMATIC LUMBER SCALER
Filed Nov. 30, 1967   3 Sheets-Sheet 3
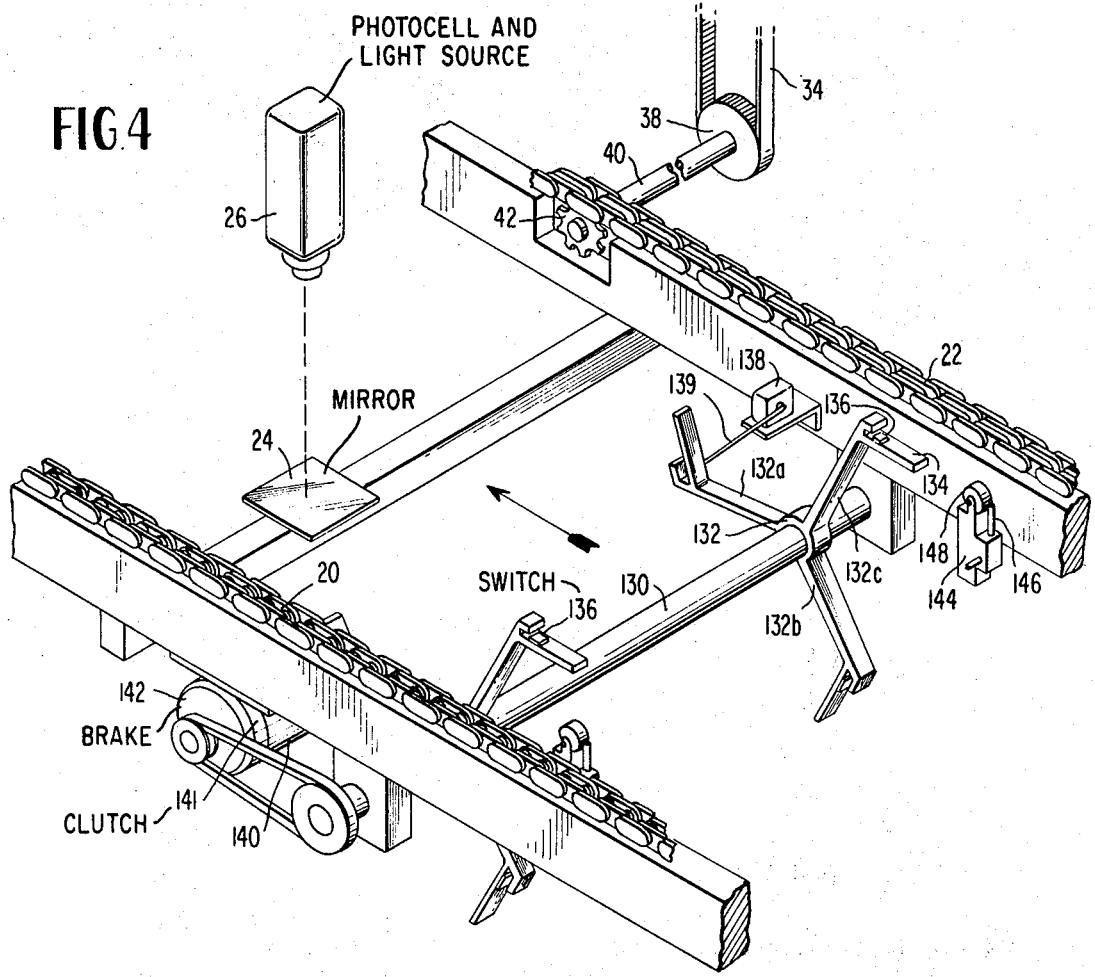
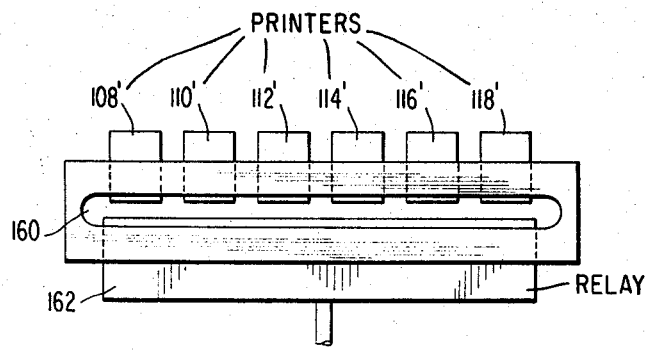
INVENTOR
CLAYBORNE C. BECK
BY *Kenyon, Palmer, Stewart & Estabrook*
ATTORNEYS 3,548,168
AUTOMATIC LUMBER SCALER
Clayborne C. Beck, Bedford, Va.
(113 Brooke Drive, Fredericksburg, Va. 22401)
Continuation-in-part of application Ser. No. 464,596, June 2, 1965, which is a continuation-in-part of application Ser. No. 385,286, July 27, 1964. This application Nov. 30, 1967, Ser. No. 687,042
Int. Cl. G06m 7/00; G01b 7/32
U.S. Cl. 235—92                                                5 Claims

ABSTRACT OF THE DISCLOSURE

Apparatus for automatic scaling of hardwood lumber is disclosed which enables scaling in accordance with standards set by the National Hardwood Lumber Association. A photocell is used to sense the passage of a board past the scaling station and to control the operation of readout counters in such fashion that the lumber is scaled exactly as if it were done with a standard board rule but with greatly increased speed and accuracy.

CROSS-REFERENCES TO RELATED APPLICATIONS

This application is a continuation-in-part of my prior application Ser. No. 464,596 filed June 2, 1965, which in turn is a continuation-in-part of application Ser. No. 385,286 filed July 27, 1964, now abandoned.

BACKGROUND OF INVENTION

In order to resolve insofar as possible all areas of conflict which might arise between the buyer and seller of hardwood lumber, the National Hardwood Lumber Association has adopted certain standards as to the grading and measuring of hardwood lumber and these standards are universally accepted throughout the United States. Prior to the instant invention, all hardwood lumber has been scaled using the so-called board rule which is actually a computing scale stick. A lumber inspector who is skilled in the use of a board rule can scale a load of lumber at a fairly good rate of speed but even the most skilled of lumber inspectors cannot scale with the speed and accuracy which is afforded with the present apparatus.

There are machines in the prior art for automatically measuring the length, width and thickness of lumber and automatically computing the number of board feet in each piece measured. An example of such a machine may be found in the expired U.S. patent to Roettger, No. 1,539,698 dated May 26, 1925. While the apparatus shown in this patent is the closest known prior art, it is totally unsuited for scaling of hardwood lumber because it fails to take into account the standards agreed upon by the National Hardwood Lumber Association.

In order to understand the objects of the present invention, it is first necessary to understand the use of the standard board rule, a portion of one side of which is shown in FIG. 1 of the attached drawings. This rule is a flexible scale stick 10 formed of wood and having a handle at one end (not shown) and at the other end a metallic foot 12 which is used to engage the long edge of the lumber being scaled. The three series of graduations which extend from the foot 12 to the opposite end of the rule are for different standard lengths of lumber and the ones illustrated in FIG. 1 are for 12, 14 and 16 foot lumber. As is well known, the basic unit of the measure of lumber is board feet and a board foot is defined as a piece of lumber which is one inch thick, twelve inches wide, and twelve inches long. So long as a piece of lumber is twelve feet long and one inch thick, the number of board feet is equal to the width of the board in inches. For thicknesses other than one inch, appropriate multiplying factors must be used. By way of example, therefore, let us assume a 12 foot long board, 1 inch thick, and of unknown width. In order to scale such a piece of lumber, the inspector, after first determining the grade of the lumber, which he must also include in his final tally, engages one edge of the board with the foot 12 and then reading up the 12 scale he determines the width. If the board is exactly 7 inches wide, for example, it will contain 7 board feet, if 10 inches wide, 10 board feet, and so on. The first problem which arises is when the width of a board falls between the integers which appear on the standard board rule. Still referring to the situation where the board is 12 feet long and 1 inch thick, let us assume that it measures 7⅜ inches in width. In accordance with the accepted standards, this would be read and tallied as 7 board feet. Had the fraction been anything over one-half as, for example, 7⁹⁄₁₆, the tally would be 8 board feet.

Whenever the thickness of the board is other than 1 inch, the tally is made in what is known as surface measure which may be later converted to board feet. Still assuming a 12 foot board but one which is 1¼ inches thick or 5/4, if the width is greater than 6½ inches but less than 7½ inches, the tally would be 7 feet of surface measure. The thickness is, of course, noted on the inspector's tally sheet and the proper correction factor is later applied in order to convert to board feet if desired.

The other two scales illustrated on the board rule of FIG. 1 are computing scales for 14 and 16 foot lumber and as expected, the distance between successive integers on these scales is less than the 1 inch separation on the 12 foot scale. In accordance with the aforementioned standards, however, the rule is read and the tally is made in exactly the same fashion for 14 and 16 foot lumber as it is for 12 foot lumber. In other words, the rule is always read to the nearest integer and the tally is made in feet of surface measure and the latter figure can be converted whenever desired into board feet by application of a multiplying factor dictated by the thickness of the lumber being scaled.

With the foregoing background, it is the principal object of the present invention to provide an automatic lumber scaling apparatus for use with a conventional lumber chain which will automatically scale standard length and random widths of lumber and automatically tally the number of surface feet of board measure taking into account for the scaling of each board the adding and dropping of fractional parts of board measure in accordance with the standards of the National Hardwood Lumber Association.

A further object of the present invention is to provide in an automatic or semi-automatic lumber scaler a readout means which will provide a tally of the number of feet of surface measure in each of a plurality of grades of lumber and also indicate the total number of boards scaled in each tally.

Still another object of the present invention is to provide in conjunction with the automatic scaling portion of the apparatus a means for automatically turning each board prior to scaling in order that the operator may grade the board prior to scaling.

Still another object of the present invention is to provide in conjunction with the board turner, an anti-jamming feature.

Other objects of the present invention will become apparent to those skilled in this art from the following detailed description when read in conjunction with the attached sheets of drawings in which:

FIG. 1 is a plan view of a conventional board rule;

FIG. 2 is a schematic wiring diagram of the scaling and board turning apparatus;

FIG. 3 is a diagrammatic showing of the control console in conjunction with a view of the gear train controlled by the length selector switches which provides the signal to the readout counters;

FIG. 4 is a perspective view of the board turning mechanism; and

FIG 5 is a diagrammatic showing of the printing apparatus for obtaining the final tally of a given run.

DETAILED DESCRIPTION OF THE DRAWINGS

When lumber is scaled manually, it is conventional to convey the boards individually by means of a pair or more of parallel chains upon which each board rests. The direction of conveying is one which is parallel to the short axis of the boards. Referring first to FIG. 4 of the attached drawings, a pair of chains 20 and 22 are shown. The boards are conveyed along these chains in the direction indicated by the arrow in this figure and they pass one at a time between a reflector 24 and a light and photocell combination 26. The means for assuring passage of one board at a time past the scaling station will be described hereinafter. Suffice to say at this point of the description, each board as it passes between the photocell 26 and the reflector 24 cuts off the light beam to the photocell during the entire time that the board is being conveyed past this point. The signal derived from the photocell 26 is utilized to operate what is in effect a computer system with either a direct dial readout or a printed readout or both for effecting a tally of the lumber scaled.

Turning now to FIG. 3 of the drawings, a basic portion of the computer mechanism is shown enclosed in a housing 28. The housing includes a pair of rotatably journaled shafts 30 and 32, the lower of which shafts 30 is an idler shaft driven in synchronism with the movement of the lumber chains 20 and 22. As indicated schematically in FIGS. 3 and 4, this drive may be effected by a straight mechanical coupling between the chains and the shaft 30. Such a mechanical coupling is schematically indicated in the drawings by a drive chain 34 which engages with a sprocket 36 affixed to the shaft 30 and, in turn, is driven from a sprocket 38 (FIG. 4) affixed to a shaft 40 which in turn is driven directly from the chain 20 by a sprocket 42. Obviously, synchronism between rotation of shaft 30 and the travel of the chains 20 and 22 could be effetced in any number of known ways as, for example, with a selsyn drive system. The upper shaft 32 is driven by the shaft 30 through a selected gear ratio and the exact ratio will be selected by the operator in accordance with the length of the boards being scaled. Here again, the interconnection between the shafts 30 and 32 with variable speed ratios could be effected in a number of ways but is illustrated diagrammatically in FIG. 3 by a series of timing belts 44, 46, 48, 50 and 52 engaging with appropriately sized pulleys on the shafts 30 and 32. The pulleys on the shaft 32 are rigidly affixed thereto, while the pulleys on the shaft 30 are normally free to idle thereon until locked to the shaft by means, for example, of a series of electromechanical clutches indicated schematically at 54, 56, 58, 60 and 62. These clutches may be selectively energized by the operator from a master control panel shown here at 64. Depending upon the length of the boards being scaled therefore the upper shaft 32 will be driven at either the same speed as the shaft 30 or at a higher or lower speed and it is the rotation of this shaft which is utilized to derive a series of electrical impulses for operating the counters which keep a running total of the surface board measure of each board being scaled. While there are numerous standard lengths, only five speed changes are shown for illustrative purposes. It will be understood that the number of speed ratios can readily be increased to encompass all standard lengths which are from four to sixteen feet. The upper shaft 32 is also equipped with a positive electromechanical brake 66, the purpose of which will be described hereinafter.

Also mounted on the shaft 32 for rotation therewith are a pair of insulating discs 68 and 70 having conductive segments or bars in their outer peripheries. A pair of brush members 72 are arranged in contact with the periphery of the disc 68 and a corresponding pair of brush members 74 contact the periphery of the disc 70. The brush members 72 and 74 constitute in effect an electrical switch which is closed whenever both brushes are in register with one of the conductive bars. This latter assembly, therefore, provides a means for deriving electrical impulses corresponding to the degree of rotation of the shaft 32 which in turn corresponds to the length of time it takes for a board to pass under the photocell 26 and therefore furnishes a basis for actuating counters to effect the desired tally. In order that the tally be in accordance with the standards of the National Hardwood Lumber Association, it is necessary that the board measure of each board be such that it corresponds to reading the standard board rule to the nearest integer. By way of example, the conductive bars on the discs 68 and 70 may be laid out on the basis of the 1 inch spacing corresponding to the 12 feet board length scale on the standard board rule. Then either by staggering the circumferential position of the bars on the disc 68 with respect to the bars on disc 70, or by staggering the relative position of the brush pairs 72 and 74, it becomes possible to control the counters in a manner which coincides exactly with reading the standard board rule to the nearest integer. Suffice to say at this point in the description, there will be occasions where the upper shaft 32 is still rotating corresponding to the presence of a portion of a board beneath the photocell 26 but when the counters are not operating or vice versa.

For purposes of illustration, the bars on the disc 68 will be described as staggered circumferentially with respect to the bars on the disc 70.

It is believed that the invention can best be understood by a consideration of the circuit diagram of FIG. 2 wherein certain of the parts from the mechanical structure of FIG. 3 appear in schematic form and with the same reference numerals.

For convenience, that portion of the wiring diagram of FIG. 2 which appears below the dotted line A—A and which relates to the lumber scaling will be described separately from that portion which lies above the line A—A and which relates entirely to the board turning and anti-jamming portion of the apparatus. The photocell 26 previously discussed with reference to FIGS. 3 and 4 forms a part of a photocell relay indicated in FIG. 2 by the numeral 100. This relay includes a series of contacts 102, 103, 104 and 106 which are normally open, normally closed, normally open and normally closed, respectively. Whenever the photocell is darkened by passage of a board between the reflector 24 and the photocell and light housing 26, the condition of these contacts reverses, that is to say, 102 closes, 103 opens, 104 closes and 106 opens. As soon as the photocell is again illuminated, these contacts revert to the condition indicated in FIG. 2. It is the condition of these contacts which controls the operation of the counters to effect the desired lumber tally. While it is desirable to provide a separate counter for each grade of lumber, there are numerous grades and only five counters 108, 110, 112, 114 and 116 are illustrated for purposes of this description. A sixth counter 118 is utilized solely as a count of the number of boards scaled. Each counter has an associated switch indicated at 108A to 116A and the operator manually closes one of these switches depending upon his opinion of the grade of lumber being scaled.

The clutches 54 to 62 described with reference to FIG. 3 are also under the manual control of the operator by means of associated switches 54A to 62A.

The clutches and shaft brake 66 operate on direct current and therefore a step-down transformer rectifier combination 120 is connected between the supply lines 122 and the controls for these elements. A master switch 124 energizes the entire control circuit when closed by the operator.

The operation of this circuit will now be described as a board approaches the photocell 26 being conveyed by the chains 20 and 22. Before the board interrupts the beam of light to the photocell, the operator will have judged the grade and length of the board and will have closed one of switches 54A to 62A, depending upon the length and one of switches 108A to 116A, depending upon the grade. With the board advancing on the chains 20 and 22 toward the photocell, the lower shaft 30 will be rotating through the drive chain 34 but the upper shaft will be stationary. As soon, however, as the leading edge of the board breaks the light beam and darkens the photocell, contacts 102 are closed, 103 opened, 104 closed and 106 opened and this permits the current from the output of the tarnsformer rectifier to flow through the selected push button switch, through the corresponding clutch and back to the other side of the transformer rectifier through the now closed contacts 104. The upper shaft 32 is therefore set in motion by the timing belt drive corresponding to the clutch selected. For reasons which will be explained hereinafter the shaft 32 always stops with a conductor bar of disc 68 in contact with brush member 72 so that the switch 72 indicated in FIG. 2, corresponding to these brush members, is normally closed and the solenoid switch 126 is energized opening its upper pair of contacts and closing it lower pair. Under these conditions, the shaft brake 66 is energized from the output of the transformer rectifier through the brake 66, the lower set of contacts of relay 126 and the normally closed contact 106 of the photocell relay and back to the other side of the transformer rectifier. Here again, as soon as the leading edge of the board breaks the beam of light to the photocell, the contact 106 of the photo relay cell opens which deenergizes the brake 66 and releases the shaft 32 for rotation. As each conductor segment on the disc 70 contacts the brushes 74 of FIG. 3, the switch 74 of FIG. 2 is closed which delivers a pulse to the selected one of the counters 108, 110, 112, 114 or 116. Rotation of the shaft 32 continues until the trailing edge of the board clears the photocell and restores the photocell relay 100 to the condition shown in FIG. 2. Since re-illumination of the photocell caused by passage of the trailing edge of the board thereby reopens contacts 102 of the photocell relay, the circuit to the counters is broken and even though rotation of the shaft continues, further closing of the switch 74 does not result in further counter operation. Rotation of the shaft 32 will continue under these conditions until the next bar of the disc 68 contacts the brushes 72 which again energizes relay 126 and simultaneously applies the brake 66 to the shaft 32 stopping the shaft and releases the clutch with the brush members 72 in contact with a conductive segment of the disc 68. The entire scaler circuit is then ready to scale the next board which comes down the chain. Since the spacing of the bars on the discs has been described as proportional to inches of board width, and since by the standards adopted by the association, a board slightly less than ½ inch wide should be tallied as zero and boards slightly more than ½ inch wide should be tallied as one, it is obvious that the staggering between the bars on the discs 68 and 70 must bear a definite relation to achieve this result. As already described, the upper shaft always stops with a bar of the disc 68 in contact with the brushes 72. The staggering then must be such that when the shaft has turned an amount corresponding to the first half inch of board width following passage of the leading edge of a board past the photocell, the first bar on disc 70 should close switch 74. Switch 74 continues to close at equal increments of rotation of shaft 32 (corresponding to successive 1 inch measurements of board width) but each closing activates a counter to effect a tally only so long as the board remains under the photocell.

It will, of course, be understood that the term "inches" in the foregoing description is replaced by surface measure for boards other than 12 feet in length and to arrive at a correct tally for such other lengths, the speed of the shaft 32 is changed. The result is that the apparatus of this invention duplicates the use of the manually operated computed scale stick now in use for scaling hardwood lumber and in each instance a fractional width lying between successive integers greater than ½ is always tallied as the next higher integer and if the fraction is less than ½, the tally corresponds to the next lowest integer.

Turning now to FIG. 4 of the drawings, the anti-jammer and board turner feature of the invention is shown. A shaft 130 is journaled for rotation below the surface of the chains 20 and 22. This shaft carries a pair of board turning spiders 132 each of which includes three radially extending arms 132A, B and C and these arms are symmetrically disposed 120 degrees apart. Each of the arms includes a board receiving portion 134 which extends outwardly and at an angle to its respective arm. Each arm 134 includes a switch 136 which is normally open but which is closed by engagement with the leading edge of a board. In a manner to be described with reference to the wiring diagram of FIG. 2, the board turner shaft 130 is rotated in response to closure of both switches 136 on a corresponding pair of the arms 132A, B or C. A further switch 138 with an operating lever 139 positioned in the path of movement of the arms 132A, B and C operates as a limit switch to stop rotation of the board turner at a predetermined point. The board turner may be driven by any suitable means such as the motor-clutch-brake combination 140, 141 and 142.

Positioned on either side of the chains 20 and 22 are a pair of stop members 144 each of which includes a solenoid operated push rod 146 and a rotatably mounted idler wheel 148. The stop members 144 are positioned at a level with respect to the chains 20 and 22 such that boards advancing on the chains will contact the wheels 148 at a point below their axes of rotation and each board simply remains in this position until the solenoid operated push rod 146 is energized to lift the leading edge of the board far enough to place its leading edge above the center of rotation of the wheels 148 which then allow the chains to convey the boards on the arms 134.

Referring now to the upper portion of the circuit diagram of FIG. 2 where the parts shown in FIG. 4 have been given the identical reference numerals, it will be noted that power to the entire board turning circuit is under the control of a manually operated switch 150 and as soon as this switch is closed, the motor 140 will operate continuously. The other manually operated switch 152 supplies power to the remainder of the control circuit and may be left in closed position so that the board turner continues to supply boards one at a time to the scaler automatically, or the switch may be manually operated each time the operator desires to advance a new board to the scaler.

As soon as the board is positioned on a corresponding pair of the arms 134 and closes the pair of switches 136 located on those arms, the relay 154 is energized opening its lower set of contacts and closing the upper set of contacts. This is effective to de-energize the brake 142 and energize the clutch 141 so that the motor 140 is now drivingly connected to the shaft 130 in order to turn the board as it is lifted on the arms 134 and permit inspection of both sides by the operator in order that he may ascertain the grade of the lumber being scaled. Rotation of the shaft 130 will continue until the arms carrying the board have released the board and until one of the arms contacts the operating arm 139 of the limit switch 138. As shown in FIG. 2, the limit switch 138 is normally open but as soon as it is closed by one of the arms 132, it energizes a second solenoid relay 156 which closes its upper set of contacts and temporarily opens its center pair of contacts and then closes its lower set of contacts. Closure of the upper set of contacts is effective to energize the two solenoid relays 146 to raise their push rods and thereby permit passage of the next succeeding board over the rollers 148 onto the next corresponding pair of arms 134 of the board turner. The temporary opening of the lower sets of contacts of relay 156 is sufficient to permit the relay 154 to drop out thus re-energizing the brake 142 and de-energizing the clutch 141 which stops rotation of the shaft 130. Since the middle and lower set of contacts of relay 156 are both jumpered, however, the relay 154 will again become energized to repeat the cycle as soon as the corresponding pairs of switches 136 are closed by the next succeeding board. Since the time of opening of the switches 136 due to dropping of the board off the arms 134 is somewhat indefinite, it is necessary to have the limit switch 138 in order that the shaft 130 may be stopped at exactly the right location for the next pair of arms to receive the next succeeding board.

Referring again to FIG. 3, the operator's console is shown with the switches and counters, the operation of which has been hereinbefore described. Diagrammatically illustrated in this figure is a slot 160 into which a tally card is inserted at the end of the scaling of a given batch of lumber in order to obtain a printed record of the number of boards scaled and the number of surface feet of boards in each grade. As shown diagrammatically in FIG. 5, the printout members 108', 110', 112', 114', 116', and 118' corresponding to the counters are positioned above the slot 160 and a relay 162 is positioned below the slot 160. The switch 162 which is positioned immediately below the slot on the console shown in FIG. 3 may be operated in order to cause the relay 162 to engage the card with the printers and effect the desired tally readout.

From the foregoing it will be apparent to those skilled in the art that there is herein shown and described a new and useful apparatus for the automatic scaling of hardwood lumber. While a preferred embodiment of the invention has been herein shown and described, applicant claims the benefit of a full range of equivalents within the scope of the appended claims.

I claim:
1. An automatic lumber scaler for use in conjunction with a conveyor which conveys boards in spaced relation one at a time with the short axis of the boards parallel to the path of travel of the conveyor, comprising:
   a rotatable shaft;
   means affording positive rotation of said shaft at different predetermined rates each directly proportional to the speed of the conveyor and dependent upon the length of a board being conveyed;
   first control means responsive to the passage of leading edge of a board being conveyed past a fixed location for starting rotation of said shaft and responsive to the passage of the trailing edge of the same board past the same location for enabling means for stopping rotation of said shaft;
   second control means responsive to predetermined positions of rotation of said shaft and operable only after passage of the trailing edge of the board past said fixed point for stopping said shaft only at the next one of said predetermined positions; and
   means for counting equal increments of rotation of said shaft, each increment corresponding to one unit of surface board measure, said counting means beginning with a count of one at the position of rotation of said shaft corresponding to passage of the first one-half unit of board surface measure past said fixed location.

2. The combination defined by claim 1 in which said first control means includes a photocell and light source so positioned with respect to the movement of boards on the conveyor that the short axis of the board interrupts the light source to the photocell during passage of the board past the cell.

3. The combination defined by claim 1 including an idler shaft driven by the conveyor chain and means including a plurality of selectively operable speed change devices coupling said shafts for driving said rotatable shaft at a selected speed proportional to the length of board being scaled.

4. A combination defined by claim 1 in which said last-mentioned means includes a plurality of identical storage units selectively operable in order to store separately the tally of lumber of different grades.

5. A combination defined by claim 1 including means for printing the total tally of lumber scaled.

References Cited
UNITED STATES PATENTS 2,860,420 11/1958 Denman, Jr., et al. ____ 33—123
2,869,788 1/1959 Turner _____ 235—92

MAYNARD R. WILBUR, Primary Examiner

J. M. THESZ, JR., Assistant Examiner

U.S. Cl. X.R.

33—123; 198—39